United States Patent [19]

Gaglia, Jr.

[11] 3,912,451
[45] Oct. 14, 1975

[54] METHOD FOR REMOVING HYDROGEN PEROXIDE FROM SOFT CONTACT LENSES

[75] Inventor: Charles A. Gaglia, Jr., Flanders, N.J.

[73] Assignee: Warner-Lambert Company, Morris Plains, N.J.

[22] Filed: Mar. 26, 1974

[21] Appl. No.: 454,141

Related U.S. Application Data

[63] Continuation-in-part of Ser. No. 366,809, June 4, 1973, abandoned.

[52] U.S. Cl. .................................... 21/58; 134/42
[51] Int. Cl.² ................... A61L 13/00; G02C 13/00
[58] Field of Search ........ 21/58; 134/2, 42; 351/160

[56] References Cited
UNITED STATES PATENTS

| | | | |
|---|---|---|---|
| 2,956,994 | 10/1960 | Peterlein | 252/429 B |
| 3,240,709 | 3/1966 | Rankin | 134/42 UX |
| 3,594,330 | 7/1971 | Delbouille et al. | 252/429 C X |
| 3,700,761 | 10/1972 | O'Driscoll et al. | 351/160 X |

OTHER PUBLICATIONS

Bitonte et al. "Symposium on the Flexible Lens" C. V. Mosby Co., St. Louis 1972, pp. 207–210.
"Hydrogen Peroxide" by Schumb, Reinhold Pub. Corporation; N.Y. 1955 pp. 468, 486–488, 616.
"Soft Contact Lens" Published C. V. Mosby Co., St. Louis (1972) p. 247.

Primary Examiner—Joseph Scovronek
Assistant Examiner—Arnold Turk
Attorney, Agent, or Firm—Albert H. Graddis

[57] ABSTRACT

A method for removing hydrogen peroxide from soft contact lenses which have been sterilized with hydrogen peroxide is disclosed. This method comprises immersing the soft contact lens in an aqueous system containing a catalyst, particularly a catalyst comprising metals of Periods 4, 5 and 6 of the Periodic Chart of the Elements and including the lanthanide elements, which acts on the hydrogen peroxide to convert it to water and free oxygen.

24 Claims, No Drawings

METHOD FOR REMOVING HYDROGEN PEROXIDE FROM SOFT CONTACT LENSES

This application is a continuation-in-part of Ser. No. 366,809 filed June 4, 1973, now abandoned.

The present invention relates to a novel method for removing hydrogen peroxide from a soft contact lens prior to insertion in the eye after it has been soaked in hydrogen peroxide for the purpose of sterilization and removal of undesirable organisms. This method comprises contacting a hydrogen peroxide-treated soft contact lens with an aqueous system containing a catalytic amount of metal of Periods 4, 5 and 6 of the Periodic Chart of the Elements and the lanthanide elements to effect the catalytic decomposition of the hydrogen peroxide to water and free oxygen.

Soft contact lenses are generally prepared from certain hydrophilic polymers. For example, the soft lens marketed by Bausch and Lomb is a homopolymer of hydroxyethylmethacrylate (HEMA) cross-linked with ethylene glycol dimethacrylate (EDMA). On the other hand, other soft contact lenses are formed of a polymer obtained by polymerizing the mixture of HEMA with some EDMA, methacrylic acid and about 20% poly (N-vinylpyrrolidone) (PVP). All the lenses produced from these materials exhibit marked hydrophilic properties and when wet are soft and flexible.

While these lenses are not actually perforate, they do have a sufficient degree of molecular porosity to permit water, oxygen and tear fluids to permeate the lens structure. In order for the cleaning of these lenses to be effective after they have been worn, it is important that all contaminants be removed from both surfaces and the interior of the lens. Hydrogen peroxide has been reported to be an effective agent for use with contact lenses in order to kill any contaminating microorganisms. As reported in "Soft Contact Lens" published by the C. V. Mosby Co., St. Louis (1972), Page 247, hydrogen peroxide penetrates the lens in about 30 seconds, oxidizes any mucoprotein that exists on the surface of the lens and is simultaneously an effective sterilant for any microorganisms present in the eye.

However, before being inserted into the eye the hydrogen peroxide-treated soft contact lens must be rinsed repeatedly in isotonnic buffered saline in order to remove any residual hydrogen peroxide. Isotonic buffered saline is an 0.85% by weight solution of sodium chloride buffered to a pH of 6.9 to 7.1 and preserved with thimerosal 0.001% and disodium edatate 0.1%. Hydrogen peroxide, even in minute amounts such as 10 to 20 ppm (parts per million) can cause some irritattion of the eye in cases of particular sensitivity. Repeated soaking and rinsing in isotonic buffered saline as presently practiced, does not always effectively remove all of the hydrogen peroxide present because rinsing merely acts to serially dilute the hydrogen peroxide to a lower concentration. Consequently, the rinsed soft contact lens can still retain a sufficient concentration of hydrogen peroxide to be irritative to the wearer.

Adequate rinsing also poses other problems. One of the principal problems is that it requires a considerable period of time and personal attention in order to carry out an adequate rinsing procedure. For an adequate soaking and rinsing sequence it has been found that four separate rinses are required. With the necessary intermediate soaking an acceptable procedure will take about 30 minutes or more. Another drawback resides in the fact that rinsing procedures and sequeunces are generally highly subjective and lack reproducibility in that they can vary widely in effectiveness from one person to another. Additionally, large volumes of saline solution are necessary to carry out an adequate four-rinse procedure which makes the practice cumbersome and inconvenient.

I have now found a simple and convenient method for treating and sterilizing soft contact lenses with hydrogen peroxide and then removing the hydrogen peroxide from the soft contact lenses while eliminating the repetitive soaking and rinsing steps which were previously considered necessary in order to remove the hydrogen peroxide.

Broadly speaking, the practice of this method is effected and the treatment of the soft contact lenses is carried out by soaking, immersing or contacting the soft contact lens in an aqueous hdyrogen peroxide system containing a hydrogen peroxide decomposition catalyst in the form of a catalytic amount of metal from Periods 4, 5 and 6 of the Periodic Chart of the Elements and the lanthanide elements. The soft contact lens is thus effectively treated and sterilized by exposure to the hydrogen peroxide action over the course of about 10 minutes. However, the treated lens need not be removed from the container in which the treatment has been effected since the catalyst present will then act to decompose the $H_2O_2$ remaining as follows:

$$2H_2O_2 \rightarrow 2H_2O + 2[O] \rightarrow O_2$$

thus removing it by converting it to the harmless reaction products, water and nascent oxygen. The latter, of course, has a further sterilizing action. Since the decomposition reaction under ordinary conditions requires about 6 hours to reduce the $H_2O_2$ to a satisfactory level, depending on the amount of the catalyst, exposed surface and the geometry of the container, even though the respective reactions are competing, effective sterilization will have occurred well before substantial decomposition of the $H_2O_2$ has taken place.

If the hydrogen peroxide solution is initially prepared to contain 0.85% by weight sodium chloride the ultimate conversion of the $H_2O_2$ to water and oxygen yields an approximately isotonic saline solution as the final product. Accordingly, when decomposition of the $H_2O_2$ is complete the lens will then be effectively stored in the substantial equivalent of isotonic saline, a very desirable medium for maintaining the original optical and dimensional parameters of the hydrophilic lens. A final single rinse in iostonic saline after discarding the $H_2O_2$ decomposition product makes subsequent insertion of the lens easy, convenient and physiologically acceptable.

In lieu of carrying out a separate final rinse in isotonic buffered saline, the necessary buffer system required to buffer the 0.85% aqueous sodium chloride solution to the desired pH of about 6.9 to 7.1 may be introduced together with the sodium chloride when it is added to the $H_2O_2$ solution employed for the sterilization.

Thus, in a typical application of this invention, a suitable amount of 3% by weight hydrogen peroxide containing sufficient sodium chloride to make an 0.85% saline solution is introduced into a container comprising a cup, a holder containing a pair of contact lenses to obe sterilized and an effective amount of the desired metal decomposition catalyst. The soft contact lenses are then allowed to remain in contact with this aqueous hydrogen peroxide system for approximately six hours. Operating under these conditions it is found that the lenses are effectively sterilized and residual hydrogen peroxide detectable after this procedure is about 20 ppm, a level which is acceptable to about 90% of contact lens wearers. To avoid any possible irritation for the other 10%, a single rinse in isotonic saline is sufficient to reduce the hydrogen perioxide to less than 10 ppm.

If the sterilization is to be carried out so that the final solution after the catalytic decomposition of the $H_2O_2$ is completed is a 0.85% aqueous solution of sodim chloride buffered to a pH of 6.9 to 7.1 a buffer system comprising a suitable combination of monobasic sodium phosphate and dibasic sodium phosphate may be included when adding the sodium chloride to the 3% by weight hydrogen peroxide solution. Thus, for example if the desired sterilization is carried out with a volume of approximately 10 cc of 3% by weight aqueous hydrogen peroxide the addition of 90 mg sodium chloride together with 0.72 mg monobasic sodium phosphate and 6.4 mg of anhdyrous dibasic sodium phosphate will yield an isotonic saline solution buffered to a pH of 7.0 as a residual solution after catalytic decomposition of the $H_2O_2$ present has occured. When buffered to a pH of 6.9 to 7.1 it has been found that an $H_2O_2$ level of even above 30 ppm can be readily tolerated by many contact lens wearers.

Other satisfactory buffer systems which may be employed and which give substantially equivalent results in buffering to a pH of 6.9 to 7.1 are suitable tartrate, succinate and glycine buffers or the MacIlvaine phosphate-citrate buffer as described in J. Biol. Chem. 183 (1921).

Among the metal hydrogen peroxide decomposition catalysts belonging to the aforesaid Periods 4, 5 and 6 of the Periodic Chart of the Elements which may, for example, be advantageously employed for effecting the hydrogen peroxide decomposition are Pt, Pd, Ir, Rh, Re, Au, Ag, Cu, Cr, Os, Co, Fe, Mo, W, Mn, Ce and Th. These catalysts are most effective in a form presenting the maximum surface for catalytic activity.

Platinum, gold or palladium are generally preferred because of their availability. The catalysts are usually supported on a carrier when in use. For example, platinum black is mounted in platinum or on other carriers such as alumina, carbon, stainless steel or any other carriers which are commonly employed as catalyst supports for these catalysts.

In practice, the catalyst is usually secured in the container in which the hydrogen peroxide sterilization procedure is carried out. In order to afford the largest surface area, it is desirable to provide a suitably shaped support for the catalyst. This support may take the form of a wire, a thin foil, or a suitably shaped pellet of aluminum oxide on which the catalyst itself is deposited.

Any other inactive support material which does not have any deleterious effect on the catalyst may also be employed as a substrate for the catalyst. Intricate molded shapes which can readily be molded from a variety of inert thermoplastic or thermosetting materials are very desirable since they can be molded to provide a relatively larger interior surface area in relation to their overall outside dimensions. These molded shapes can then be coated with the catalyst by forming the desired active metal catalyst, such as platinum black, on their surfaces. Since the catalytic activity is a surface phenomenon, there is no advantage in having the catalyst present in solid form. Indeed, in the case of some active metals both the initial cost and replacement cost would be prohibitive. Thus, providing the greatest surface of active catalyst on an inactive support is most feasible economically.

Of particular interest as a molded shaped substrate for the hydrogen peroxide decomposition catalyst is the polymeric material marketed under the trademark "Noryl" by the General Electric Company. This plastic material is a phenylene oxide polymer formed by the oxidative polymerization of 2,6-dimethylphenol in the presence of an amine-basic cupric salt complex as the oxygen-carrying intermediate. These phenylene oxide polymers are more particularly described in U.S. Pat. Nos. 3,306,874 and 3,306,875.

One of the more readily available and useful catalysts is platinum black which may be supported either on platinum in the form of a thin wire having a diameter of 0.01 to 0.05 inches or on platinum foil. The wire or foil may then be secured on the inner surface of the container. This container is then ready for use in treating soft contact lenses with the hydrogen peroxide and then removing it from the treated soft contact lenses.

One very convenient form of platinum black catalyst which is particularly suitable for use in the present invention is the platinum black catalyst supported on alumina pellets which is commercially available from the Engelhard Industries Division of Engelhard Minerals and Chemicals Corp., Murray Hill, N.J. and identified as their 0.3% platinum or 0.5% platinum on one-eighth inch alumina pellets. These one-eighth alumina pellet catalysts are also available with 0.5% by weight of either palladium, ruthenium or rhodium. These one-eighth inch alumina pellet catalysts are also available from Matheson, Coleman & Bell, East Rutherford, N.J. The latter identify their catalyst as the PX 1267 catalyst which is a 0.3% by weight platinum black alumina pellet catalyst or as their PX 1267-1 which is a 0.5% by weight platinum black alumina pellet catalyst. These one-eighth inch alumina pellets are 0.125 inches in diameter and vary from about 0.139 to about 0.156 inches in length. A single pellet of this catalyst carries from about 0.1 to 0.3 milligrams of platinum black and is quite suitable for continued daily use as a catalyst for the decomposition of commercially available 3% aqueous hydrogen peroxide in an amount of 8 to 10 cc. One or preferably several of these pellets can be conveniently placed in the storage container employed for carrying out the daily hydrogen peroxide sterilization of soft contact lenses. Since these platinum black catalyst pellets remain very effective for a considerable time, they need only be replaced at periodic intervals. However, since they are readily available at moderate cost, for complete assurance it is recommended that they be replaced periodically and whenever their efficiency and activity appears to slow down. Their activity can be readily checked by visual observation of the production of oxygen bubbles when the hydrogen peroxide solution is added to the container in which the soft contact lenses and catalysts are stored and in which the sterilization is carried out.

While the platinum black catalyst may be applied to the substrate by electrolytic deposition as hereinafter described, a very convenient and highly effective method for depositing a platinum black coating on the substrate is to cover the surfaces of the substrate with chloroplatinic acid and to then reduce the chloroplatinic acid to platinum black in a hydrogen atmosphere. A solution of chloroplatinic acid in any suitable aqueous or organic solvent may be sprayed on the substrate, such as variously shaped pellets, and after the solvent has been evaporated the pellets with the chloroplatinic acid on their surfaces are now placed in a chamber under hydrogen pressure of about 30 pounds per sq. inch and reduction to platinum black is completed in about 6 hours. Since elevated reaction temperature is not necessary, the use of room temperature for the hydrogen reduction is quite satisfactory.

While water may be used as the solvent for the chloroplatinic acid in preparing the chloroplatinic acid solution for the coating step, use of a volatile solvent is preferable since it may be evaporated off more readily. Alcohols such as methyl, ethyl, propyl, isopropyl, isobutyl, n-butyl and heptyl alcohol are satisfactory solvents as are other common solvents such as acetone, methylethylketone, methylisobutylketone, ethylacetate, acetonitrile and 1,4-dioxane, or even isopropylamine.

Solutions containing 0.1 to 1% by weight of chloroplatinic acid may be conveniently employed. Sufficient chloroplatinic acid should be deposited on the substrate to yield a coating of platinum black amounting to from about 0.2 to 0.5 mgs. per sq. centimeter after reduction.

The substrate may also be coated with platinum black by first coating it with a solution of chloroplatinic acid which on heating will chemically reduce the chloroplatinic acid to platinum black. Such a solution is one made up of equal volumes of aqueous 5% chloroplatinic acid, formaldehyde U.S.P., ethanol U.S.P., 1N aqueous sodium hydroxide and 0.5 volume of 1% aqueous sodium carbonate. The substrate is preferably preheated to 100°C then uniformly coated with the above solution and then heated again to 100°C for about 10 minutes. The procedure is repeated until the desired amount of platinum black is deposited on the substrate. To remove any residual sodium carbonate and sodium hydroxide the coated substrate is washed in distilled water, soaked for about 2 hours in 1N aqueous hydrochloric acid and then washed twice with distilled water.

In order to further illustrate the practice of this invention, the following examples are included:

EXAMPLE 1

Where platinum black on platinum is employed as the catalyst, it may readily be obtained by electrolytic deposition on either platinum wire or platinum foil. The metal to be coated is connected to the negative terminal of a 3 volt d-c power supply and is then immersed in a solution of 3% platinic chloride containing 0.025% lead acetate. A piece of platinum wire is attached to the positive terminal to serve as the anode. Current is allowed to flow for 30 seconds. The platinizing solution is removed and the metal washed with 1N sulfuric acid and allowed to soak in the wash for about one minute. Discard the wash, return the metal to the platinizing solution and allow the current to flow for another 30 seconds. Remove the platinizing solution and rinse the metal with distilled water. The platinum black forms and adherent, uniform and complete coating on the surface of the carrier.

Platinum black deposited on a platinum wire 0.041 inches in diameter and 5 inches long presents a surface of platinum black of about 0.77 square inches in area.

Similarly, platinum black can be deposited on both of the surfaces of a platinum foil strip one-fourth inch wide and 2 inches long by the same electrolytic deposition procedure which can also serve as a catalyst for the decomposition of hydrogen peroxide.

EXAMPLE 2

Into a cylindrical container, approximately 9 cc. in volume, is placed the 5 inch platinum wire coated with platinum black as prepared in Example 1. The wire is coiled to fit against the inside wall of the cup, spiraling from the bottom to about one-eighth inch from the top. A pair of soft contact lens to be sterilized is then placed in the cup and approximately 9 ml of isotonic saline (0.85% sodium chloride) containing 3% hydrogen peroxide is added. The hydrogen peroxide concentration is initially about 30,000 ppm and sufficient to thoroughly sterilize the lenses on exposure to this hydrogen peroxide solution for about 10 to 15 minutes. Catalytic decomposition takes place rapidly with the concentration of $H_2O_2$ versus time being shown in the following table:

| $H_2O_2$ Concentration (PPM) | | | | |
|---|---|---|---|---|
| At 1 hr. | At 2 hrs. | At 4 hrs. | At 6 hrs. | 6 hrs. + one isotonic saline rinse |
| 5650 | 1625 | 315 | 140 | 5.9 |

The hydrogen peroxide concentration is determined by the procedure of Nordschow, et al., Anal. Chem. 40, 465 (1968).

EXAMPLE 3

The soft contact lens sterilization procedure described in Example 2 is again repeated but with the hydrogen peroxide decomposition catalyst employed in this procedure being 18 inches of coiled 0.016 inch diameter platinum wire previously coated with platinum black by means of the electrolytic procedure previously described in Example 1.

The hydrogen peroxide levels determined at the intervals indicated in three different test procedures were the following:

| $H_2O_2$ Concentration (PPM) | | | | |
|---|---|---|---|---|
| At 1 hr. | At 2 hrs. | At 4 hrs. | At 6 hrs. | 6 hrs. + one isotonic saline rinse |
| 470 | 240 | 55 | 13 | 1.8 |
| 930 | 390 | 85 | 20.1 | 2.1 |
| 550 | 355 | 112 | 36.1 | 4.96 |

EXAMPLE 4

The soft contact lens sterilization procedure described in Example 2 is repeated using as the hydrogen peroxide decomposition catalyst two 2 inch by one-fourth inch strips of platinum foil coated with platinum black which are placed against the inner surface of the test cup to expose one face only. The platinum black coating is formed by the electrolytic procedure described above. The exposed catalyst area is approximately 1 square inch.

The hydrogen peroxide levels determined at the intervals indicated are the following:

| $H_2O_2$ Concentration (PPM) | | | | |
|---|---|---|---|---|
| At 1 hr. | At 2 hrs. | At 4 hrs. | At 6 hrs. | 6 hrs. + one isotonic saline rinse |
| 140 | 47 | 4.6 | <1 | <1 |

EXAMPLE 5

The soft contact lens sterilization procedure described in Example 2 is repeated using as the hydrogen peroxide decomposition catalyst the platinum black coated aluminum oxide pellets previously described carrying 0.3% by weight of platinum black. The number of pellets employed varied as indicated with the hydrogen peroxide levels being determined in each instance at the same intervals as in previous tests and the following concentrations were noted:

| Catalyst Pellets Used | $H_2O_2$ Concentration (PPM) | | | | |
|---|---|---|---|---|---|
| | At 1 hr. | At 2 hrs. | At 4 hrs. | At 6 hrs. | 6 hrs. + one isotonic saline rinse |
| 7 | 3150 | 304 | 97.8 | 35.2 | 1.3 |
| 10 | 1399 | 126 | 32.6 | 8.7 | 0.6 |
| 12 | 550 | 50.5 | 9.8 | 1.8 | 0.2 |

From the above, it is readily apparent that the rate of decomposition of the hydrogen peroxide is dependent upon catalyst area provided. Accordingly, any desired rate may be achieved and the desired treatment period determined by increasing or decreasing the number of catalyst pellets employed.

EXAMPLE 6

Twenty cylindrically shaped pellets one-half inch long and five-eighths inch in diameter provided with six peripherally spaced vertical one-eighth inch wide flutes about one-sixteenth inch deep to provide additional surface area and formed of "Noryl" are introduced into a small tablet coating pan and, while the pan is rotating at about 40 r.p.m. a 0.5% by weight solution of $H_2PtCl_6$ (chloroplatinic acid) in U.S.P. ethyl alcohol is sprayed into the pan until all of the moving pellets are wet. Hot air is then blown into the pan until the ethyl alcohol has evaporated off. Alcoholic chloroplatinic acid solution is again sprayed into the pan until the pellets are wetted and the alcohol again evaporated off by using a current of hot air. The procedure is repeated until about 30 cc of solution has been sprayed for each 10 cylinders present in the coating pan.

The dried chloroplatinic acid coating adhering to the surface of the pellets is then converted to platinum black by reduction with gaseous hydrogen. The coated pellets are placed in a closed vessel under about 30 lbs. per sq. in. hydrogen pressure and maintained under this hydrogen atmosphere for about 6 hours at a temperature of 20° to 25°C to effect the desired reduction.

Each pellet carries about 4.5 mg by weight of platinum black which is equivalent to about 0.2% by weight of the base material.

EXAMPLE 7

The soft contact lens sterilization procedure described in Example 2 is repeated using as the hydrogen peroxide decomposition catalyst a platinum black coated pellet prepared in accordance with Example 6. The hydrogen peroxide levels are determined in each instance at the same intervals as in the previous tests. Using 10 cc of 3% by weight hydrogen peroxide as the sterilizing medium, the following $H_2O_2$ concentrations were noted at the intervals indicated.

| Catalyst Pellets Used | $H_2O_2$ Concentration (PPM) | | | |
|---|---|---|---|---|
| | At 1 hr. | At 2 hrs. | At 4 hrs. | At 6 hrs. |
| 1 | 440 | 151 | 41 | 14 |
| 1 | 615 | 192 | 48 | 16 |
| 1 | 475 | 148 | 36 | 11 |
| 1 | 410 | 139 | 39 | 9 |
| 1 | 345 | 115 | 26 | 9 |

EXAMPLE 8

The soft contact lens sterilization procedure described in Example 7 is repeated again using 10 cc of 3% by weight hydrogen peroxide to which has been added 90 mg of sodium chloride, 0.72 mg monobasic sodium phosphate and 6.4 mg of anhydrous dibasic sodium phosphate. The $H_2O_2$ concentrations noted after 5 hours in each of five separate tests were 20 ppm, 26 ppm, 20 ppm, 13 ppm. and 19 ppm respectively. The pH was 7.0. Over the course of nineteen separate tests the average $H_2O_2$ residue after 5 hours was 26 ppm.

I claim:

1. A method for removing hydrogen peroxide from a soft contact lens treated with hydrogen peroxide to effect sterilization which comprises contacting said lens with an aqueous system containing a catalytic amount of a hydrogen peroxide decomposition catalyst.

2. A method for treating a soft contact lens to effect sterilization which comprises contacting said lens with an aqueous hydrogen peroxide sterilizing system containing a catalytic amount of a hydrogen peroxide decomposition catalyst.

3. A method in accordance with claim 2 wherein said catalyst is selected from the metals of Periods 4, 5 and 6 of the Periodic Chart of the Elements and the lanthanide elements.

4. A method according to claim 3 wherein said metal is Pt, Pd, Ir, Rh, Re, Au, Ag, Cu, Cr, Os, Co, Fe, Mo, W, Mn, Ce or Th.

5. A method according to claim 4 wherein said catalyst is platinum black.

6. A method according to claim 4 wherein said catalyst is mounted on a carrier.

7. A method according to claim 6 wherein said carrier is platinum.

8. A method according to claim 6 wherein said carrier is aluminum oxide.

9. A method according to claim 5 wherein said platinum black is supported on a platinum carrier in the form of a wire.

10. A method according to claim 5 wherein said platinum black is supported on a platinum carrier in the form of a foil.

11. A method according to claim 5 wherein said platinum black is supported on an aluminum oxide carrier in the form of a pellet.

12. A method for treating a soft contact lens to effect the sterilization of said contact lens and render it suitable for insertion into the eye upon completion of sterilization, which comprises placing said soft contact lens in an aqueous hydrogen peroxide sterilizing solution containing an approximately isotonic concentration of sodium chloride and a catalytic amount of a hydrogen peroxide decomposition catalyst and maintaining said contact lens in said solution until the hydrogen peroxide present is less than about 10 ppm.

13. A method according to claim 12 where said catalyst is selected from the metals of Periods 4, 5 and 6 of the Periodic Chart of the Elements and the lanthanide elements.

14. A method according to claim 12 wherein said metal is Pt, Pd, Ir, Rh, Re, Au, Ag, Cu, Cr, Os, Co, Fe, Mo, W, Mn, Ce or Th.

15. A method in accordance with claim 12 wherein the sodium chloride concentration is about 0.85% by weight.

16. A method in accordance with claim 12 wherein the hydrogen peroxide decomposition catalyst is platinum and the sodium chloride concentration is about 0.85% by weight.

17. A method for treating a soft contact lens to effect the sterilization of said contact lens and render it suitable for insertion into the eye upon completion of sterilization, which comprises placing said soft contact lens in an aqueous hydrogen peroxide sterilizing solution containing an approximately isotonic concentration of sodium chloride buffered to a pH of 6.9 to 7.1 and a catalytic amount of hydrogen peroxide decomposition catalyst and maintaining said contact lens in said solution until the hydrogen peroxide present is less than about 30 ppm.

18. A method according to claim 17 where said catalyst is selected from the metals of Periods 4, 5 and 6 of the Periodic Chart of the Elements and the lanthanide elements.

19. A method according to claim 17 wherein said metal is Pt, Pd, Ir, Rh, Re, Au, Ag, Cu, Cr, Os, Co, Fe, Mo, W, Mn, Ce or Th.

20. A method in accordance with claim 17 wherein the sodium chloride concentration is about 0.85% by weight.

21. A method in accordance with claim 17 wherein the hydrogen peroxide decomposition catalyst is platinum and the sodium chloride concentration is about 0.85% by weight.

22. A method according to claim 6 wherein said carrier is a synthetic plastic material.

23. A method according to claim 6 wherein said carrier is a synthetic thermoplastic material.

24. A method according to claim 6 wherein said carrier is a phenylene oxide polymer.

* * * * *